(12) United States Patent
Jasim et al.

(10) Patent No.: US 12,348,156 B2
(45) Date of Patent: Jul. 1, 2025

(54) VOLTAGE SOURCE CONVERTER SWITCHING VALVE WITH DYNAMIC TARGET VOLTAGE

(71) Applicant: GE Vernova Infrastructure Technology LLC, Greenville, SC (US)

(72) Inventors: Omar Jasim, Stafford (GB); Colin Davidson, Stafford (GB); Amit Kumar, Stafford (GB)

(73) Assignee: GE Vernova Infrastructure Technology, Greenville, SC (US)

( * ) Notice: Subject to any disclaimer, the term of this patent is extended or adjusted under 35 U.S.C. 154(b) by 200 days.

(21) Appl. No.: 18/149,867

(22) Filed: Jan. 4, 2023

(65) Prior Publication Data

US 2023/0223865 A1    Jul. 13, 2023

(30) Foreign Application Priority Data

Jan. 13, 2022 (EP) ..................................... 22275004

(51) Int. Cl.
    *H02M 7/483*    (2007.01)
    *H02J 3/36*     (2006.01)
    *H02M 1/32*     (2007.01)

(52) U.S. Cl.
    CPC ............. *H02M 7/4835* (2021.05); *H02J 3/36* (2013.01); *H02M 1/32* (2013.01)

(58) Field of Classification Search
    CPC ........... H02M 7/4835; H02M 1/32; H02J 3/36
    See application file for complete search history.

(56) References Cited

U.S. PATENT DOCUMENTS

2021/0376758 A1*  12/2021  Ying .................... H02M 7/4833
2021/0408937 A1   12/2021  Bhattacharya et al.
(Continued)

FOREIGN PATENT DOCUMENTS

CN        111211675 A  *  5/2020  .............. H02M 1/32

OTHER PUBLICATIONS

Siemaszko: Fast Sorting Method for Balancing Capacitor Voltages in Modular Multilevel Converters. IEEE Transactions on Power Electronics, vol. 30, No. 1, pp. 463-470, Jan. 2015.
(Continued)

*Primary Examiner* — Harry R Behm
(74) *Attorney, Agent, or Firm* — Eversheds Sutherland (US) LLP

(57) ABSTRACT

There is provided a switching valve for a voltage source converter, the switching valve comprising a plurality of modules, each module including at least one switching element and at least one energy storage device, each switching element and each energy storage device in each module arranged to be combinable to selectively provide a voltage source, the switching valve including a regulator programmed to selectively control the switching of the switching elements to select one or more of the modules to contribute a respective voltage to a switching valve voltage, wherein the regulator is programmed to selectively regulate an energy stored in each energy storage device by controlling the switching of the switching elements to regulate a voltage of each energy storage device towards a target voltage, and the regulator is programmed to vary the target voltage of each energy storage device as a function of a number of healthy modules.

13 Claims, 9 Drawing Sheets

(56) References Cited

U.S. PATENT DOCUMENTS

2022/0109364 A1* 4/2022 Sonnathi ............... H02M 1/325
2023/0318474 A1* 10/2023 Vasiladiotis .......... H02M 5/297
                                                              363/74

OTHER PUBLICATIONS

Extended European Search Report issued in EP Application No. 22275004.4 dated Jun. 28, 2022, 9 pages.

* cited by examiner

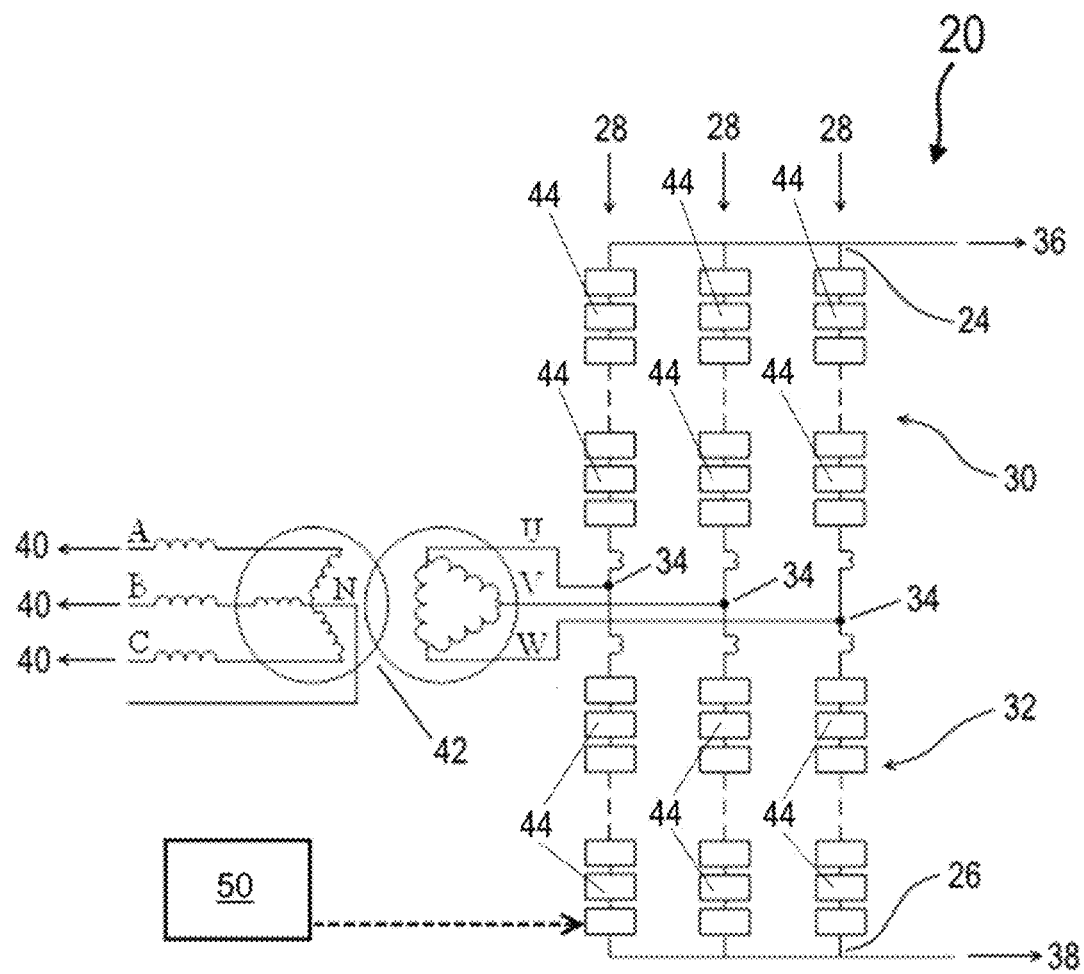
Figure 1
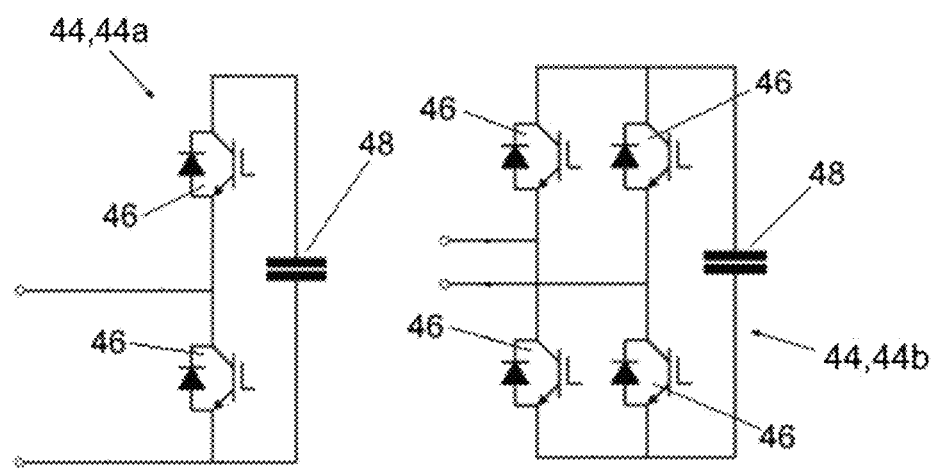
Figure 2  Figure 3

VOLTAGE SOURCE CONVERTER SWITCHING VALVE WITH DYNAMIC TARGET VOLTAGE

TECHNICAL FIELD

This invention relates to a switching valve for a voltage source converter, a voltage source converter, a method of operating a switching valve and a method of operating a voltage source converter, preferably for use in high voltage direct current (HVDC) transmission and reactive power compensation.

BACKGROUND OF THE INVENTION

In HVDC power transmission networks AC power is typically converted to DC power for transmission via overhead lines, under-sea cables and/or underground cables. This conversion removes the need to compensate for the AC capacitive load effects imposed by the power transmission medium, i.e. the transmission line or cable, and reduces the cost per kilometre of the lines and/or cables, and thus becomes cost-effective when power needs to be transmitted over a long distance. DC power is also transmitted directly from offshore wind parks to onshore AC power transmission networks. The conversion between DC power and AC power is utilised where it is necessary to interconnect DC and AC networks. In any such power transmission network, converters (i.e. power converters) are required at each interface between AC and DC power to affect the required conversion from AC to DC or from DC to AC.

SUMMARY OF THE INVENTION

According to a first aspect of the invention, there is provided a switching valve for a voltage source converter, the switching valve comprising a plurality of modules, each module including at least one switching element and at least one energy storage device, the or each switching element and the or each energy storage device in each module arranged to be combinable to selectively provide a voltage source, the switching valve including a regulator programmed to selectively control the switching of the switching elements to select one or more of the modules to contribute a or a respective voltage to a switching valve voltage, wherein the regulator is programmed to selectively regulate an energy stored in each energy storage device by controlling the switching of the switching elements to regulate a voltage of each energy storage device to or towards a target voltage, and the regulator is programmed to vary the target voltage of each energy storage device as a function of a number of healthy modules in the switching valve.

The configuration of the invention provides a control methodology for regulating the energy stored in the energy storage devices of the switching valve as a function of the number of healthy modules in the switching valve. This enables the switching valve to continue reliable operation when the number of healthy modules decrease, instead of being brought offline by triggering a system trip when the number of healthy modules decrease below a certain threshold.

In a preferred embodiment of the invention, the plurality of modules may include at least one redundant module. The increased reliability provided by the energy regulation in accordance with the invention not only extends the operation of the switching valve by avoiding a system trip when the number of healthy modules decrease below a certain threshold, but also allows the total number of redundant modules to be reduced, thus reducing capital and operational expenditure of the switching valve.

In embodiments of the invention, the regulator may be programmed to selectively maintain a sum of the voltages of the modules when varying the target voltage of each energy storage device as a function of a number of healthy modules in the switching valve. This control approach is designed to keep the voltage of each module within a normal operating range to enhance reliability.

In other embodiments of the invention, the regulator may be programmed to selectively maintain a total energy stored in the switching valve when varying the target voltage of each energy storage device as a function of a number of healthy modules in the switching valve. This control approach is designed to keep the voltage of each module approximately balanced between a voltage rating limit of each module and a utilisation limit of each module.

In embodiments of the invention, the regulator may be programmed to determine the target voltage of each energy storage device as a function of an actual operating condition of the voltage source converter when varying the target voltage of each energy storage device as a function of a number of healthy modules in the switching valve so that the energy stored in each energy storage device stays within energy storage limits of that energy storage device.

As a result of determining the target voltage of each energy storage device to take into account actual operating conditions of the voltage source converter, the robustness of the operation of the switching valve is improved by limiting the energy stored in each energy storage device between energy storage limits of that energy storage device as operating conditions of the voltage source converter (such as DC voltage, active power demand and reactive power demand) change. This is because such changes in operating conditions, if not taken into account, may result in the energy storage limits being exceeded.

In further embodiments of the invention, the regulator may be programmed to determine the target voltage of each energy storage device as a function of a voltage factor of the voltage source converter when varying the target voltage of each energy storage device as a function of a number of healthy modules in the switching valve so that the energy stored in each energy storage device stays above a lower energy storage limit of that energy storage device. In such embodiments, the voltage factor is preferably a function of a measured DC voltage of the voltage source converter.

In still further embodiments of the invention, the regulator may be programmed to determine the target voltage of each energy storage device as a function of a measured maximum voltage out of the voltages of the energy storage devices when varying the target voltage of each energy storage device as a function of a number of healthy modules in the switching valve so that the energy stored in each energy storage device stays below an upper energy storage limit of that energy storage device.

According to a second aspect of the invention, there is provided a voltage source converter comprising at least one switching valve according to any one of the first aspect of the invention and its embodiments. The features and advantages of the switching valve of the first aspect of the invention and its embodiments apply mutatis mutandis to the features and advantages of the voltage source converter of the second aspect of the invention and its embodiments.

The voltage source converter may include a plurality of switching valves, each of which is configured in accordance with any one of the first aspect of the invention and its embodiments.

The variation of the target voltage of each energy storage device as a function of a number of healthy modules in each switching valve may be performed independently of the variation of the target voltage of each energy storage device as a function of a number of healthy modules in the or each other switching valve. This ensures that the failure of a module in one switching valve only affects the target voltage (s) of the energy storage devices in the same switching valve and not the other switching valves, thus providing the switching valves with independent energy regulation capabilities. Furthermore, the target voltage of each energy storage device in each switching valve may be set to be the same or different from the target voltage of each energy storage device in the or each other switching valve.

In the voltage source converter of the invention, the regulator may be programmed to determine the target voltage of each energy storage device as a function of a measured maximum voltage out of the voltages of the energy storage devices of the switching valves when varying the target voltage of each energy storage device as a function of a number of healthy modules in the switching valve so that the energy stored in each energy storage device stays below an upper energy storage limit of that energy storage device.

According to a third aspect of the invention, there is provided a method of operating a switching valve, wherein the switching valve is for a voltage source converter, the switching valve comprising a plurality of modules, each module including at least one switching element and at least one energy storage device, the or each switching element and the or each energy storage device in each module arranged to be combinable to selectively provide a voltage source, the method comprising the steps of:
 controlling the switching of the switching elements to select one or more of the modules to contribute a or a respective voltage to a switching valve voltage;
 regulating an energy stored in each energy storage device by controlling the switching of the switching elements to regulate a voltage of each energy storage device to or towards a target voltage; and
 varying the target voltage of each energy storage device as a function of a number of healthy modules in the switching valve.

The features and advantages of the switching valve of the first aspect of the invention and its embodiments apply mutatis mutandis to the features and advantages of the method of the third aspect of the invention and its embodiments.

In the method of the invention, the plurality of modules may include at least one redundant module.

The method of the invention may include the step of maintaining a sum of the voltages of the modules when varying the target voltage of each energy storage device as a function of a number of healthy modules in the switching valve. The method of the invention may include the step of maintaining a total energy stored in the switching valve when varying the target voltage of each energy storage device as a function of a number of healthy modules in the switching valve.

The method of the invention may include the step of determining the target voltage of each energy storage device as a function of an actual operating condition of the voltage source converter when varying the target voltage of each energy storage device as a function of a number of healthy modules in the switching valve so that the energy stored in each energy storage device stays within energy storage limits of that energy storage device. The method of the invention may include the step of determining the target voltage of each energy storage device as a function of a voltage factor of the voltage source converter when varying the target voltage of each energy storage device as a function of a number of healthy modules in the switching valve so that the energy stored in each energy storage device stays above a lower energy storage limit of that energy storage device. Preferably the voltage factor is a function of a measured DC voltage of the voltage source converter. The method of the invention may include the step of determining the target voltage of each energy storage device as a function of a measured maximum voltage out of the voltages of the energy storage devices when varying the target voltage of each energy storage device as a function of a number of healthy modules in the switching valve so that the energy stored in each energy storage device stays below an upper energy storage limit of that energy storage device.

According to a fourth aspect of the invention, there is provided a method of operating a voltage source converter, the voltage source converter comprising at least one switching valve, the or each switching valve comprising a plurality of modules, each module including at least one switching element and at least one energy storage device, the or each switching element and the or each energy storage device in each module arranged to be combinable to selectively provide a voltage source, the method comprising the method of any one of the third aspect of the invention and its embodiments. The features and advantages of the first, second and third aspects of the invention and their embodiments apply mutatis mutandis to the features and advantages of the method of the fourth aspect of the invention and its embodiments.

The method may further include the step of performing the variation of the target voltage of each energy storage device as a function of a number of healthy modules in each switching valve independently of the variation of the target voltage of each energy storage device as a function of a number of healthy modules in the or each other switching valve. The method of the invention may include the step of determining the target voltage of each energy storage device as a function of a measured maximum voltage out of the voltages of the energy storage devices of the switching valves when varying the target voltage of each energy storage device as a function of a number of healthy modules in the switching valve so that the energy stored in each energy storage device stays below an upper energy storage limit of that energy storage device.

Each module in the switching valve of the invention may vary in configuration, non-limiting examples of which are set out as follows.

In a first exemplary configuration of a module, the or each switching element and the or each energy storage device in the module may be arranged to be combinable to selectively provide a unidirectional voltage source. For example, the module may include a pair of switching elements connected in parallel with an energy storage device in a half-bridge arrangement to define a 2-quadrant unipolar module that can provide zero or positive voltage and can conduct current in two directions. In a second exemplary configuration of a module, the or each switching element and the or each energy storage device in the module may be arranged to be combinable to selectively provide a bidirectional voltage source. For example, the module may include two pairs of switching elements connected in parallel with an energy storage device in a full-bridge arrangement to define a 4-quadrant bipolar module that can provide negative, zero or positive voltage and can conduct current in two directions.

The plurality of modules may be connected in series to define a chain-link converter. The structure of the chain-link converter permits build-up of a combined voltage across the chain-link converter, which is higher than the voltage available from each of its individual modules, via the insertion of the energy storage devices of multiple modules, each providing its own voltage, into the chain-link converter. In this manner switching of the or each switching element in each module causes the chain-link converter to provide a stepped variable voltage source, which permits the generation of a voltage waveform across the chain-link converter using a step-wise approximation. Hence the chain-link converter is capable of providing a wide range of complex voltage waveforms.

At least one switching element may be a wide-bandgap material based switching element or a silicon semiconductor based switching element. Examples of wide-bandgap materials include, but are not limited to, silicon carbide, boron nitride, gallium nitride and aluminium nitride. At least one switching element may include at least one self-commutated switching device. The or each self-commutated switching device may be an insulated gate bipolar transistor (IGBT), a gate turn-off thyristor (GTO), a field effect transistor (FET), a metal-oxide-semiconductor field-effect transistor (MOSFET), an injection-enhanced gate transistor (IEGT), an integrated gate commutated thyristor (IGCT), a bimode insulated gate transistor (BIGT) or any other self-commutated switching device. The number of switching devices in each switching element may vary depending on the required voltage and current ratings of that switching element. At least one switching element may further include a passive current check element that is connected in anti-parallel with the or each switching device. The or each passive current check element may include at least one passive current check device. The or each passive current check device may be any device that is capable of limiting current flow in only one direction, e.g. a diode. The number of passive current check devices in each passive current check element may vary depending on the required voltage and current ratings of that passive current check element.

Each energy storage device may be any device that is capable of storing and releasing energy to selectively provide a voltage, e.g. a capacitor, fuel cell or battery.

The configuration of the voltage source converter may vary depending on its operating requirements. In embodiments of the invention, the voltage source converter may include at least one converter limb, the or each converter limb extending between first and second DC terminals, the or each converter limb including first and second limb portions separated by an AC terminal, each limb portion including a switching valve according to any one of the first aspect of the invention and its embodiments. In a preferred embodiment of the invention, the voltage source converter includes three converter limbs, each of which is connectable via the respective AC terminal to a respective phase of a three-phase AC network. It will be appreciated that the voltage source converter may include a different number of converter limbs, each of which is connectable via the respective AC terminal to a respective phase of an AC network with the corresponding number of phases.

BRIEF DESCRIPTION OF THE DRAWINGS

Preferred embodiments of the invention will now be described, by way of non-limiting examples, with reference to the accompanying drawings in which:

FIG. 1 shows a voltage source converter according to an embodiment of the invention;

FIG. 2 shows a schematic view of an exemplary half-bridge chain-link module;

FIG. 3 shows a schematic view of an exemplary full-bridge chain-link module;

DETAILED DESCRIPTION

Figure 4:
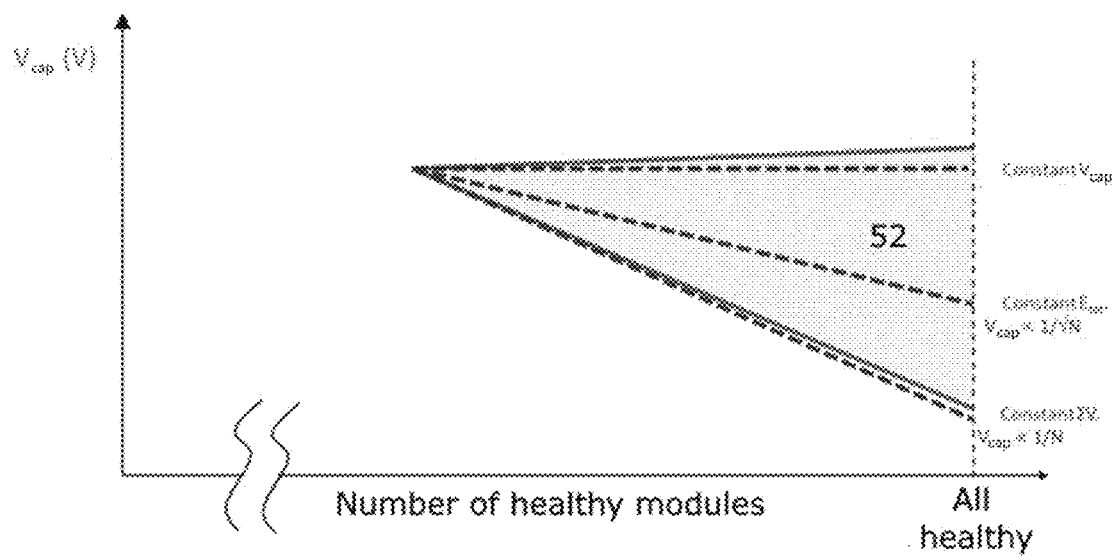
FIG. 4 shows a variation of the target voltage of a capacitor in accordance with the invention.

The figures are not necessarily to scale, and certain features and certain views of the figures may be shown exaggerated in scale or in schematic form in the interests of clarity and conciseness. The following embodiments of the invention are used primarily in AC-DC voltage source conversion in HVDC applications, but it will be appreciated that the following embodiments of the invention are applicable mutatis mutandis to other types of voltage source converters and other applications operating at different voltage levels.

A voltage source converter according to an embodiment of the invention is shown in FIG. 1 and is designated generally by the reference numeral 20. The voltage source converter 20 includes first and second DC terminals 24,26 and a plurality of converter limbs 28. Each converter limb 28 extends between the first and second DC terminals 24,26 and includes first and second limb portions 30,32 separated by a respective AC terminal 34. In each converter limb 28, the first limb portion 30 extends between the first DC terminal 24 and the AC terminal 34, while the second limb portion 32 extends between the second DC terminal 26 and the AC terminal 34. In use, the first and second DC terminals 24,26 of the voltage source converter 20 are respectively connected to a DC network 36,38. In use, the AC terminal 34 of each converter limb 28 of the voltage source converter 20 is connected to a respective AC phase of a three-phase AC network 40 via a star-delta transformer arrangement 42. It is envisaged that in other embodiments of the invention the transformer arrangement 42 may be a star-star transformer arrangement, may be another type of transformer arrangement or may be omitted altogether. The three-phase AC network 40 is an AC power grid 40.

Each limb portion 30,32 includes a switching valve, which includes a chain-link converter that is defined by a plurality of series-connected modules 44. Each module 44 may vary in topology, examples of which are described as follows. FIG. 2 shows schematically the structure of an exemplary module 44 in the form of a half-bridge module 44a. The half-bridge module 44a includes a pair of switching elements 46 and a capacitor 48. Each switching element 46 of the half-bridge module 44a is in the form of an IGBT which is connected in parallel with an anti-parallel diode. The pair of switching elements 46 are connected in parallel with the capacitor 48 in a half-bridge arrangement to define a 2-quadrant unipolar module 44a that can provide zero or positive voltage and can conduct current in both directions. FIG. 3 shows schematically the structure of an exemplary module 44 in the form of a full-bridge module 44b. The full-bridge module 44b includes two pairs of switching elements 46 and a capacitor 48. Each switching element 46 of the full-bridge module 44b is in the form of an IGBT which is connected in parallel with an anti-parallel diode.

The pairs of switching elements 46 are connected in parallel with the capacitor 48 in a full-bridge arrangement to define a 4-quadrant bipolar module 44b that can provide negative, zero or positive voltage and can conduct current in both directions.

The structure of a given module 44 includes the arrangement and type of switching elements 46 and energy storage device 48 used in the given module 44. It will be appreciated that it is not essential for all of the modules 44 to have the same module structure. For example, the plurality of modules 44 may comprise a combination of half-bridge modules 44a and full-bridge modules 44b.

It is envisaged that, in other embodiments of the invention, each switching element 46 of each module 44 may be replaced by a gate turn-off thyristor (GTO), a field effect transistor (FET), a metal-oxide-semiconductor field-effect transistor (MOSFET), an injection-enhanced gate transistor (IEGT), an integrated gate commutated thyristor (IGCT), a bimode insulated gate transistor (BIGT) or any other self-commutated semiconductor device. It is also envisaged that, in other embodiments of the invention, each diode may be replaced by a plurality of series-connected diodes.

The capacitor 48 of each module 44 is selectively bypassed or inserted into the corresponding chain-link converter by changing the states of the switching elements 46. This selectively directs current through the capacitor 48 or causes current to bypass the capacitor 48, so that the module 44 provides a zero or non-zero voltage. The capacitor 48 of the module 44 is bypassed when the switching elements 46 in the module 44 are configured to form a short circuit in the module 44, whereby the short circuit bypasses the capacitor 48. This causes current in the corresponding chain-link converter to pass through the short circuit and bypass the capacitor 48, and so the module 44 provides a zero voltage, i.e. the module 44 is configured in a bypassed mode. The capacitor 48 of the module 44 is inserted into the corresponding chain-link converter when the switching elements 46 in the module 44 are configured to allow the current in the corresponding chain-link converter to flow into and out of the capacitor 48. The capacitor 48 then charges or discharges its stored energy so as to provide a non-zero voltage, i.e. the module 44 is configured in a non-bypassed mode.

In this manner the switching elements 46 in each module 44 are switchable to control flow of current through the corresponding capacitor 48.

It is possible to build up a combined voltage across each chain-link converter, which is higher than the voltage available from each of its individual modules 44, via the insertion of the capacitors of multiple modules 44, each providing its own voltage, into each chain-link converter. In this manner switching of the switching elements 46 in each module 44 causes each chain-link converter to provide a stepped variable voltage source, which permits the generation of a voltage waveform across each chain-link converter using a step-wise approximation. Hence, the switching elements 46 in each limb portion 30,32 are switchable to selectively permit and inhibit flow of current through the corresponding capacitor 48 in order to control a voltage across the corresponding limb portion 30,32. Thus, the switching of the switching elements 46 are controlled to select one or more of the modules 44 to contribute a or a respective voltage to a switching valve voltage.

Each switching valve may include one or more redundant modules 44 to act as a back-up in the event of failure of one or more modules 44.

It is envisaged that, in other embodiments of the invention, each module 44 may be replaced by another type of module which includes at least one switching element and at least one energy storage device, the or each switching element and the or each energy storage device in each such module arranged to be combinable to selectively provide a voltage source.

It is also envisaged that, in other embodiments of the invention, the capacitor 48 in each module 44 may be replaced by another type of energy storage device which is capable of storing and releasing energy to provide a voltage, e.g. a battery or a fuel cell.

The voltage source converter 20 further includes a regulator 50 programmed to control the switching of the switching elements 46. For the purposes of simplicity, the regulator 50 is exemplarily described with reference to its implementation as a single regulator unit. In other embodiments, the regulator 50 may be implemented as a plurality of regulator units. The configuration of the regulator 50 may vary depending on specific requirements of the voltage source converter 20. For example, the regulator 50 may include a plurality of regulator units, each of which is configured to control the switching of the switching elements 46 of a respective one of the modules 44. Each regulator unit may be configured to be internal to, or external of, the corresponding module 44. Alternatively, the regulator may include a combination of one or more regulator units internal to the corresponding module 44 and one or more regulator units external of the corresponding module 44. Each regulator unit may be configured to communicate with at least one other regulator unit via telecommunications links.

Operation of the voltage source converter 20 is described as follows with reference to FIGS. 4 to 12.

To regulate an energy stored in each capacitor 48, the regulator is programmed to control the switching of the switching elements 46 to regulate a voltage of each capacitor 48 to or towards a target voltage. Such regulation results in the charging or discharging of the capacitor's stored energy as necessary to achieve the target voltage or follow the target voltage as closely as possible. It will be understood that a healthy module 44 is a module that is or remains capable of performing its intended operation, while an unhealthy or failed module 44 is one that is incapable of performing its intended operation.

Conventionally a fixed target voltage is set for each switching valve and, the energy stored in the capacitors 48 of the modules 44 are regulated by regulating the voltage of each capacitor 48 to or towards the fixed target voltage for all operating conditions and independently of the number of redundant modules 44 that has been used up.

In the invention, the regulator 50 is programmed to vary the target voltage of each capacitor 48 as a function of a number of healthy modules 44 in the corresponding switching valve. The target voltage is the same for all capacitors 48 belonging to the same switching valve. The target voltage for the capacitors 48 in each switching valve may be set to be the same or different from the target voltage for the capacitors 48 in the other switching valves. Optionally the regulator 50 may be programmed to determine the target voltage of each capacitor 48 as a function of an actual operating condition of the voltage source converter 20 when varying the target voltage of each capacitor 48 as a function of a number of healthy modules 44 in the corresponding switching valve so that the energy stored in each capacitor 48 stays within energy storage limits of that capacitor 48.

FIG. 4 illustrates a variation of the target voltage $V_{cap}$ of each capacitor 48 with the number of healthy modules 44 in the corresponding switching valve. The region 52 indicates the possible range of the target voltage $V_{cap}$ of each capacitor 48 as a function of the number of healthy modules 44 in the corresponding switching valve, where the region has: an upper limit defined by a voltage rating limit of each module 44; and a lower limit defined by a utilisation limit of each module 44.

The target voltage $V_{cap}$ can be determined by two non-limiting ways:

Keep a sum of the voltages ΣV of the capacitors 44 in the same switching valve constant. This means that the target voltage $V_{cap}$ varies with (1/N) where N is the number of healthy modules 44. This control approach is designed to keep the voltage of each module 44 within a nominal operating range to enhance reliability, which reduces stress on power electronic components of the modules 44 and increases utilisation of redundant modules 44.

Keep a total energy $E_{tot}$ stored in the switching valve constant. This means that the target voltage $V_{cap}$ varies with (1/√N) where N is the number of healthy modules 44. This control approach is designed to keep the voltage of each module approximately balanced between a voltage rating limit of each module 44 and a utilisation limit of each module 44. This reduces stress on power electronic components of the modules 44 and increases utilisation of redundant modules 44.

These two non-limiting ways of determining the target voltage $V_{cap}$ is in contrast to an alternative way of leaving the target voltage $V_{cap}$ as constant, which is represented by the top line in FIG. 4. As a result of this alternative way, the capacitors 44 are constantly operated at high voltage, which increases stress on power electronic components of the modules 44 and reduces utilisation of redundant modules 44.

Figure 5:
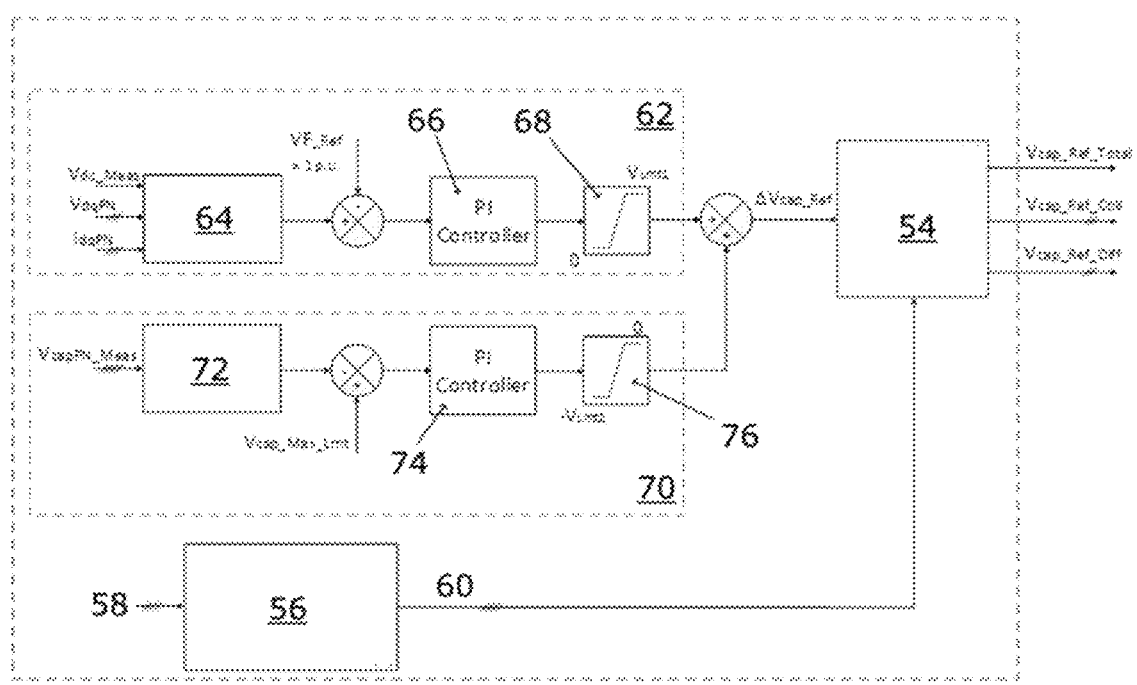
FIG. 5 shows a configuration of a regulator of the voltage source converter of FIG. 1.

FIG. 5 shows an example block diagram of the module energy control reference generation in the regulator 50. An energy control reference generation block 54 is configured to determine a total voltage reference $V_{cap\_Ref\_Total}$, a collective voltage reference $V_{cap\_Ref\_Coll\_X}$ and a differential voltage reference $V_{cap\_Ref\_Diff\_X}$ for the regulator 50 to regulate the energy stored in the modules 44 of the switching valves.

A target voltage calculation block 56 is configured to: receive an input 58 indicating the number of healthy modules 44 in each switching valve; and provide an output 60 indicating a determined target voltage of each capacitor 44 as a function of the number of healthy modules 44 in the corresponding switching valve. The determination of the target voltage of each capacitor 44 as a function of the number of healthy modules 44 in the corresponding switching valve may be carried out using either of the non-limiting ways described above. The input 58 is a vector of six values indicating the number of healthy modules 44 in the six switching valves, while the output 60 is a vector of six values indicating the target voltage of the healthy modules 44 in the six switching valves.

A voltage factor limitation block 62 is configured to determine a first voltage offset to be applied to the target voltage determined by the target voltage calculation block 56. The purpose of the voltage factor limitation block 62 is to keep the voltage factor lower than 1 p.u. In the event of a change in DC voltage of the voltage source converter 20, a corresponding change in the voltage factor may lead to the modulation index of the voltage source converter 20 to exceed 1 p.u. In this case, it is important to ensure that the energy stored in each capacitor 48 stays above a lower energy storage limit of that capacitor 48. The voltage factor calculation block 64 receives, as inputs, a DC voltage measured at a DC point of connection and direct and quadrature positive and negative sequence AC voltage components $V_{dqPN}$ measured at an AC point of connection and direct and quadrature positive and negative sequence current components $I_{dqPN}$ measured at the transformer valve winding side (i.e. the current between the transformer arrangement 42 and the voltage source converter 20), which are used to calculate a voltage factor. The calculated voltage factor is then compared with a voltage factor reference threshold $VF_{\_Ref}$ of 1 p.u. The difference between the calculated voltage factor and the voltage factor reference threshold $VF_{\_Ref}$ is processed, for example by a proportional-integral controller 66, to determine the first voltage offset, which is limited by a voltage limitation block 68 to be larger than zero so as to avoid a negative value of the first voltage offset during normal operating conditions (i.e. when the voltage factor is lower than 1 p.u.).

A capacitor voltage limitation block 70 is configured to determine a second voltage offset to be applied to the target voltage determined by the target voltage calculation block 56. The purpose of the capacitor voltage limitation block 70 is to control a maximum capacitor voltage measured from the capacitors 48 of the switching valves so that the energy stored in each capacitor 48 stays below an upper energy storage limit of that capacitor 48. In the event of a change in active or reactive power demand of the voltage source converter 20, a corresponding change in capacitor voltage may lead to a maximum allowed voltage of the capacitor 48 being exceeded. The maximum and filters block 72 receives the maximum measured voltages $V_{capPN\_Meas}$ of the capacitors 48 of the switching valves as an input, which is used to determine the maximum voltage out of the voltages of the capacitors 48 of the switching valves. The determined maximum voltage is then compared with a maximum capacitor reference threshold $V_{cap\_Max\_Lmt}$. The difference between the determined maximum voltage and the maximum capacitor reference threshold $V_{cap\_Max\_Lmt}$ is processed, for example by a proportional-integral controller 74, to determine the second voltage offset, which is limited by a voltage limitation block 76 to be smaller than zero so as to avoid a positive value of the second voltage offset during normal operating conditions (i.e. when the maximum voltage out of the voltages of the capacitors 48 of the switching valves is lower than the maximum capacitor reference threshold $V_{cap\_Max\_Lmt}$ in p.u.).

The first and second voltage offsets are combined into a combined voltage offset $\Delta V_{cap\_Ref}$ and provided to the energy control reference generation block 54 as an input. The energy control reference generation block 54 applies the combined voltage offset $\Delta V_{cap\_Ref}$ to the output 60 of the target voltage calculation block 56 in order to determine a new target voltage for each capacitor 44 of each switching valve. The calculation of the target voltage for each capacitor 44 of each switching valve is calculated below:

$$V_{capP\_A\_Targ\_New} = V_{capP\_A\_Targ} + \Delta V_{cap\_Ref}$$

$$V_{capP\_B\_Targ\_New} = V_{capP\_B\_Targ} + \Delta V_{cap\_Ref}$$

$$V_{capP\_C\_Targ\_New} = V_{capP\_C\_Targ} + \Delta V_{cap\_Ref}$$

$$V_{capN\_A\_Targ\_New} = V_{capN\_A\_Targ} + \Delta V_{cap\_Ref}$$

$$V_{capN\_B\_Targ\_New} = V_{capN\_B\_Targ} + \Delta V_{cap\_Ref}$$

$$V_{capN\_C\_Targ\_New} = V_{capN\_C\_Targ} + \Delta V_{cap\_Ref}$$

Where $V_{capP\_X\_Targ\_New}$ and $V_{capN\_X\_Targ\_New}$ are the new target voltages for each capacitor 44 of each switching valve, subscript P refers to the switching valves of the first limb portions 30, subscript N refers to the switching valves of the second limb portions 23, and subscript X refers to each of the three AC phase A, B, C.

The total voltage reference $V_{cap\_Ref\_Total}$, the collective voltage reference $V_{cap\_Ref\_Coll\_X}$ and the differential voltage reference $V_{cap\_Ref\_Diff\_X}$ are given below:

$$V_{cap\_Ref\_Total} = \Sigma((V_{capP\_A\_Targ\_New})^2 + (V_{capP\_B\_Targ\_New})^2 + (V_{capP\_C\_Targ\_New})^2 + (V_{capN\_A\_Targ\_New})^2 + (V_{capN\_B\_Targ\_New})^2 + (V_{capN\_C\_Targ\_New})^2)/6$$

$$V_{cap\_Ref\_Coll\_X} = \Sigma((V_{capP\_X\_Targ\_New})^2 + (V_{capN\_X\_Targ\_New})^2)/2$$

$$V_{cap\_Ref\_Diff\_X} = \Sigma((V_{capN\_X\_Targ\_New})^2 - (V_{capP\_X\_Targ\_New})^2)/2$$

The total voltage reference $V_{cap\_Ref\_Total}$ is provided to a total energy control of the regulator 50. The collective voltage reference $V_{cap\_Ref\_Coll\_X}$ is provided to a collective energy control of the regulator 50. The differential voltage reference $V_{cap\_Ref\_Diff\_X}$ is provided to a differential energy control of the regulator 50. Outputs of the total energy control, the collective energy control and the differential energy control with a calculated DC current demand are added to provide a switching valve current reference to switching valve voltage demands for the switching valves.

Simulation studies were run to illustrate the working of the invention as follows, with reference to FIGS. 6 to 18. Onshore converter results are presented for a 900 MW, ±320 kV HVDC power transmission scheme, with two transformers on onshore and offshore voltage source converters, operating at $P_{ac}$=580 MW and AC voltage control with near zero reactive power.

At 5.30 seconds, an offshore wind park is requested to provide 580 MW of power. At 9.5 seconds, steady state power is reached. At 10 seconds, a step change in the target voltage $V_{cap}$ of each capacitor 48 is applied. Different step changes in the target voltage $V_{cap}$ of each capacitor 48 are applied for each switching valve to simulate different numbers of healthy modules 44 (i.e. different redundancy status).

At 10 seconds, $V_{cap}$ of the switching valve of the first limb portion 30 for phase A is changed from 1 p.u. to 1.1 p.u., $V_{cap}$ of the switching valve of the first limb portion 30 for phase B is changed from 1 p.u. to 1.075 p.u., $V_{cap}$ of the switching valve of the first limb portion 30 for phase C is changed from 1 p.u. to 1.05 p.u., $V_{cap}$ of the switching valve of the second limb portion 30 for phase A is changed from 1 p.u. to 1.06 p.u., $V_{cap}$ of the switching valve of the second limb portion 30 for phase B is changed from 1 p.u. to 1.08 p.u., and $V_{cap}$ of the switching valve of the second limb portion 30 for phase C is changed from 1 p.u. to 1.12 p.u.

At 12 seconds for a duration of 1 second, all target voltages $V_{cap}$ for the capacitors 48 of the switching valves are further increased by a step change of 0.04 p.u. to emulate the voltage factor limitation function, so that $V_{cap}$ of the switching valve of the first limb portion 30 for phase A is changed from 1.1 p.u. to 1.14 p.u., $V_{cap}$ of the switching valve of the first limb portion 30 for phase B is changed from 1.075 p.u. to 1.115 p.u., $V_{cap}$ of the switching valve of the first limb portion 30 for phase C is changed from 1.05 p.u. to 1.09 p.u., $V_{cap}$ of the switching valve of the second limb portion 30 for phase A is changed from 1.06 p.u. to 1.1 p.u., $V_{cap}$ of the switching valve of the second limb portion 30 for phase B is changed from 1.08 p.u. to 1.12 p.u., and $V_{cap}$ of the switching valve of the second limb portion 30 for phase C is changed from 1.12 p.u. to 1.16 p.u.

At 13 seconds, $V_{cap}$ of the switching valve of the first limb portion 30 for phase A is changed from 1.14 p.u. to 1.1 p.u., $V_{cap}$ of the switching valve of the first limb portion 30 for phase B is changed from 1.115 p.u. to 1.075 p.u., $V_{cap}$ of the switching valve of the first limb portion 30 for phase C is changed from 1.09 p.u. to 1.05 p.u., $V_{cap}$ of the switching valve of the second limb portion 30 for phase A is changed from 1.1 p.u. to 1.06 p.u., $V_{cap}$ of the switching valve of the second limb portion 30 for phase B is changed from 1.12 p.u. to 1.08 p.u., and $V_{cap}$ of the switching valve of the second limb portion 30 for phase C is changed from 1.16 p.u. to 1.12 p.u.

It will be appreciated that the above examples of step changes in target voltage $V_{cap}$ are intended to be illustrative and are exaggerated in scale for clarity purposes.

Figure 6:
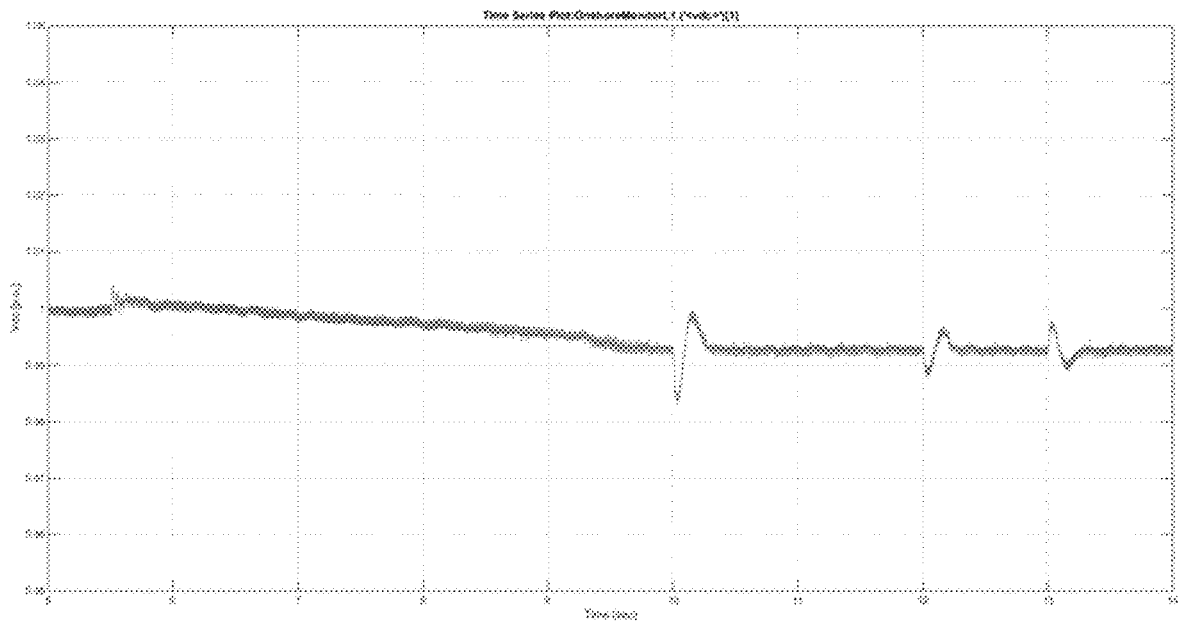
FIGS. 6 to 18 shows simulation studies to illustrate the working of the invention.
Figure 7:
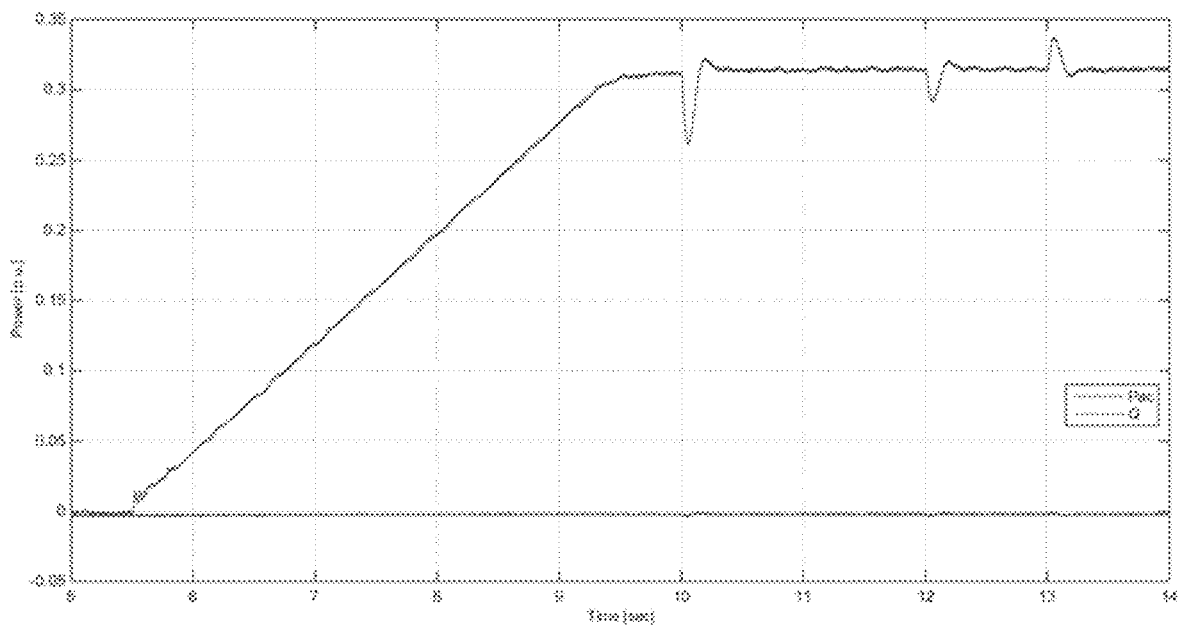
Figure 8:
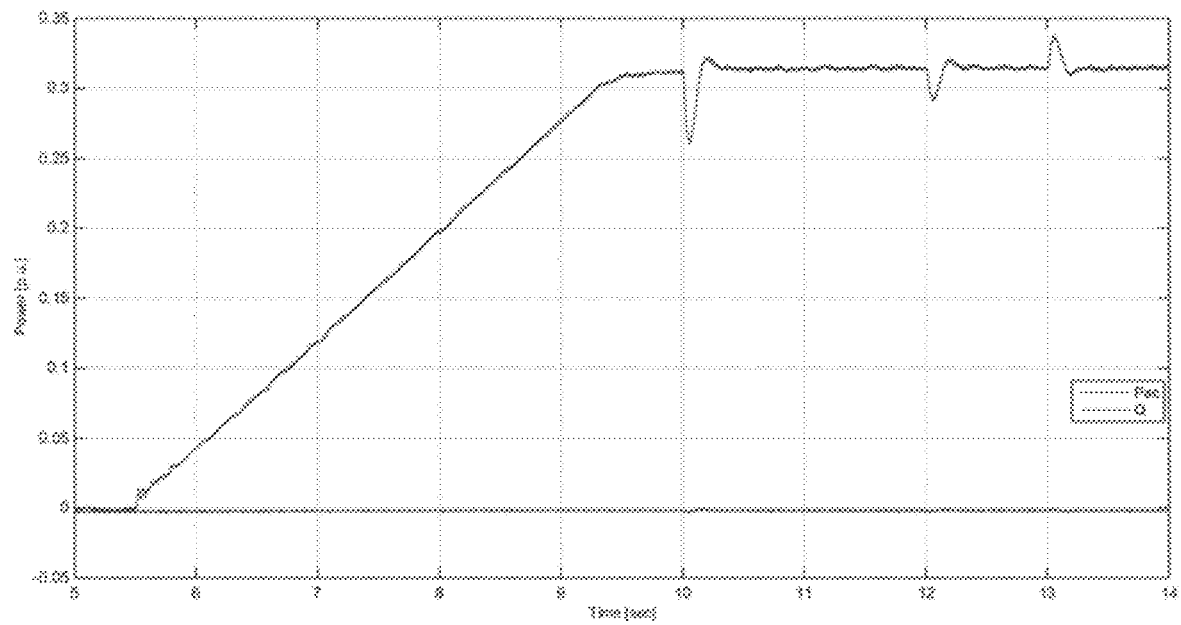
Figure 9:
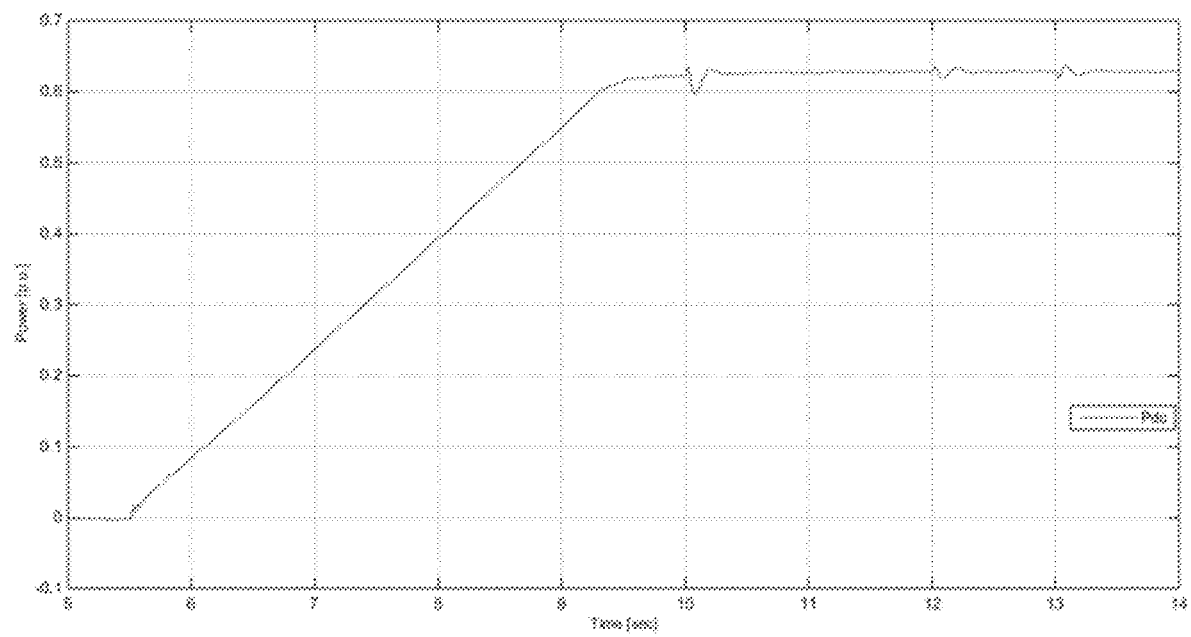
Figure 10:
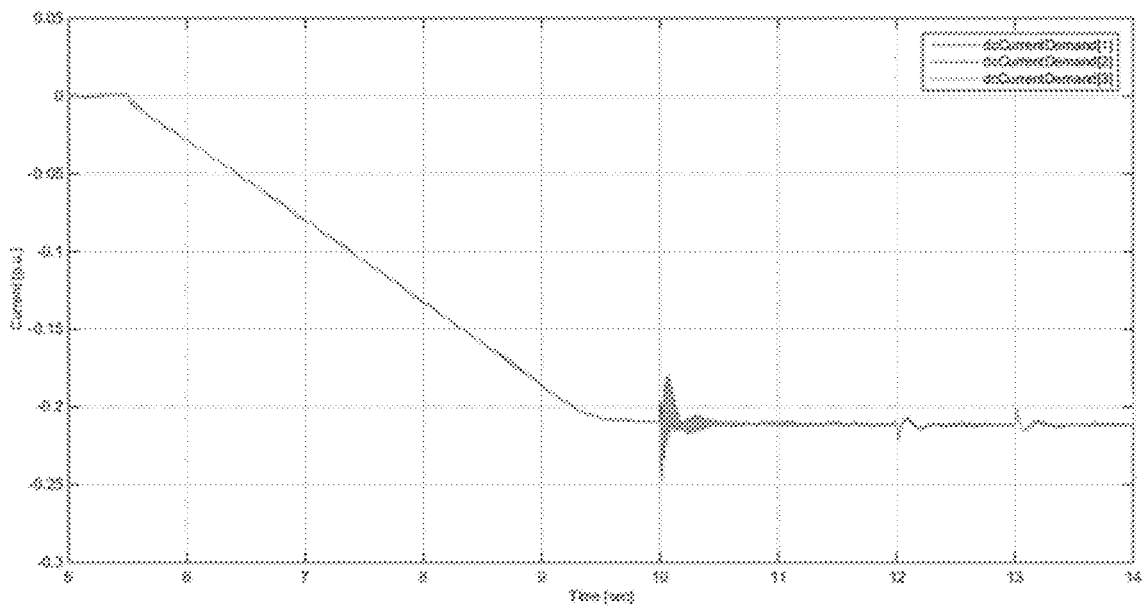

FIG. 6 shows a measured DC voltage for a positive pole to ground. FIG. 7 shows measured AC active and reactive powers at an onshore AC point of connection for the first transformer. FIG. 8 shows measured AC active and reactive powers at an onshore AC point of connection for the second transformer. FIG. 9 shows a DC power measured at an onshore DC point of connection. FIG. 10 shows calculated DC current demand for the three phases of the voltage source converter 20.

Figure 11:
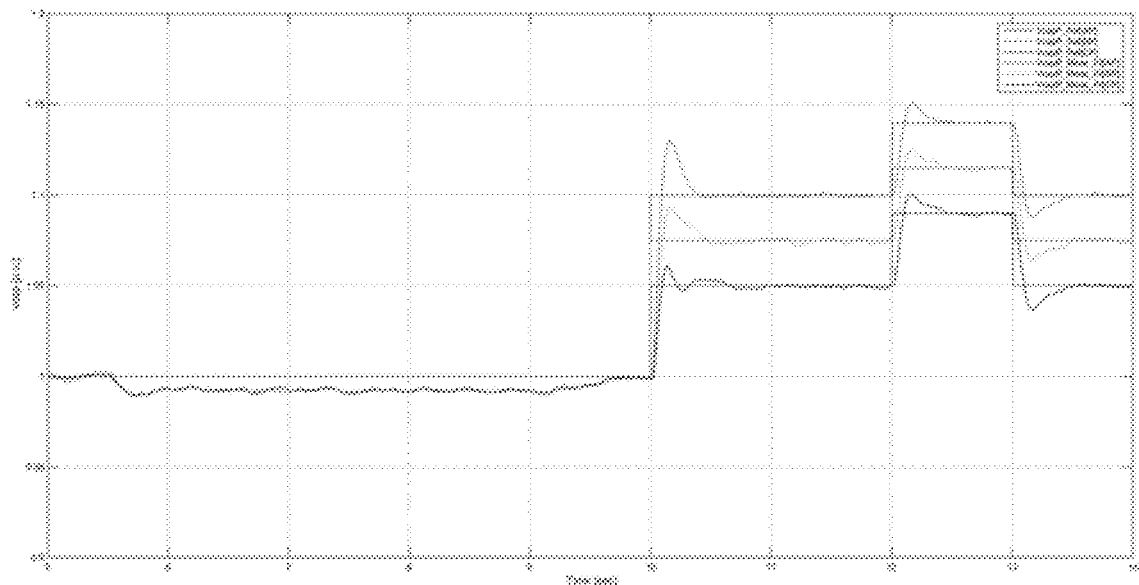
Figure 12:
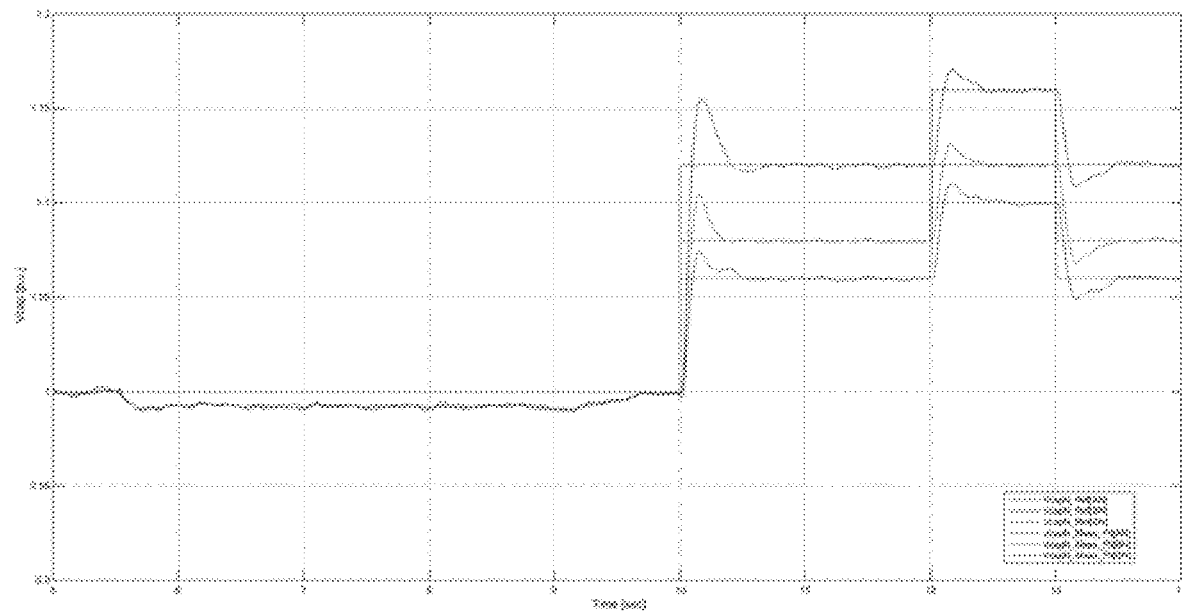

FIG. 11 shows target voltages and measured voltages for the capacitors 48 of the first limb portions 30 with a moving average filter to remove oscillatory components. FIG. 12 shows target voltages and measured voltages for the capacitors 48 of the second limb portions 32 with a moving average filter to remove oscillatory components.

Figure 13:
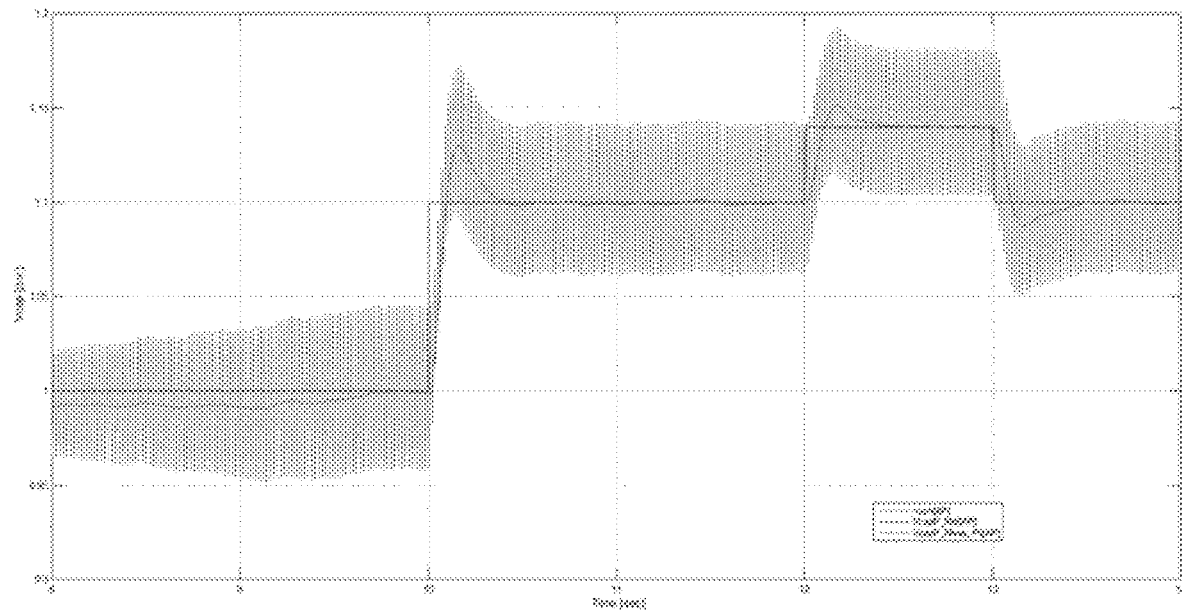
Figure 14:
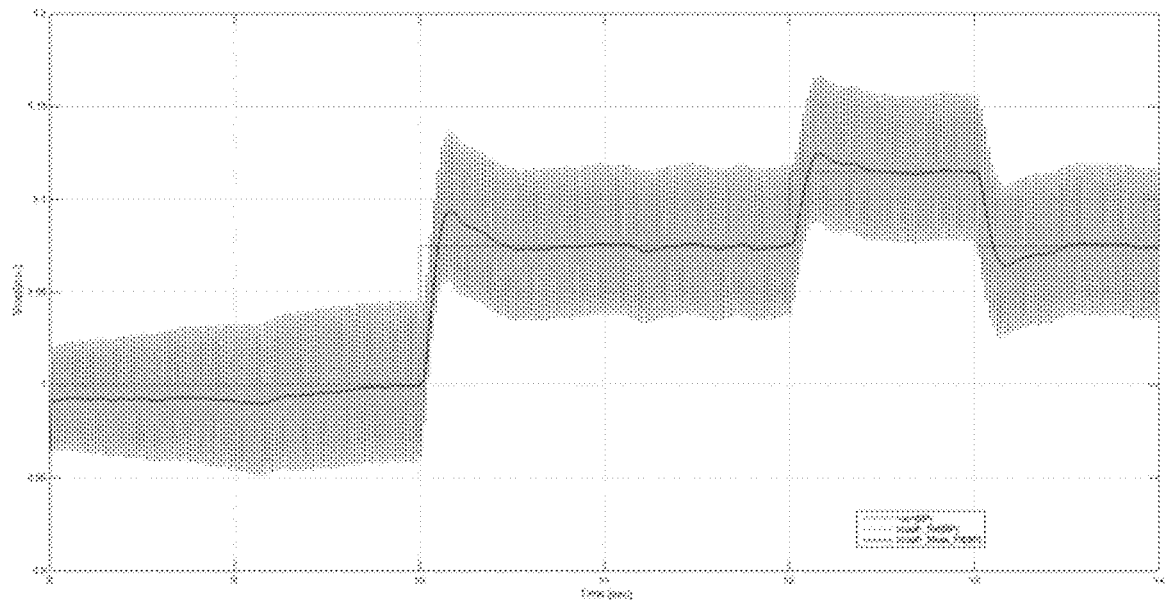
Figure 15:
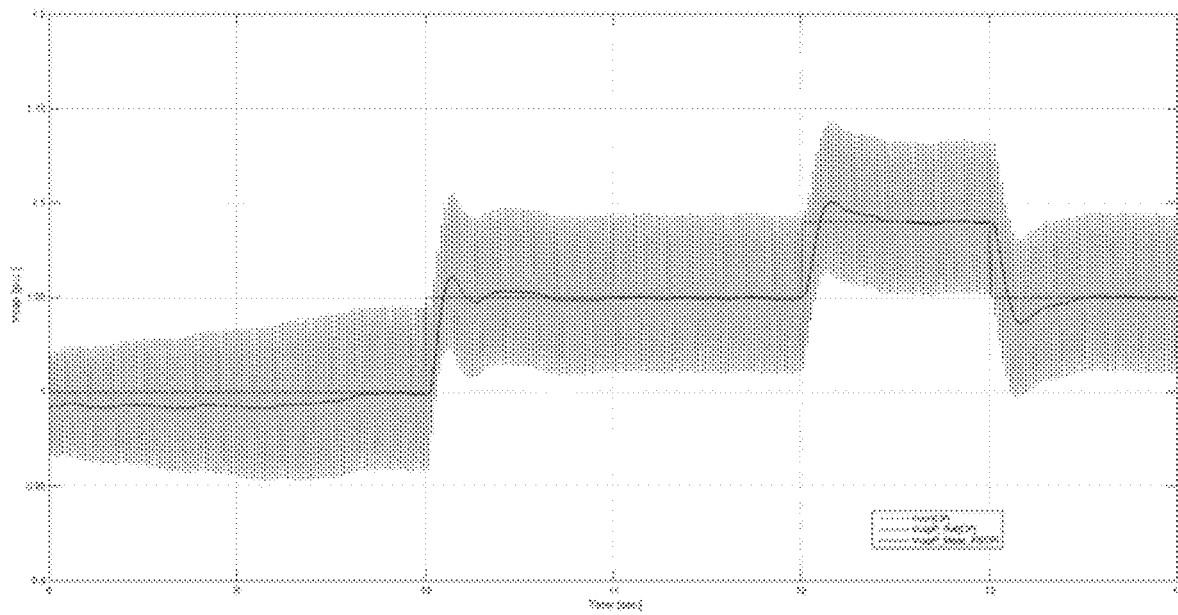

FIG. 13 shows (i) target voltages, (ii) measured voltages and (iii) measured voltages with a moving average filter to remove oscillatory components, for the capacitors 48 of the first limb portion 30 connected to Phase A. FIG. 14 shows (i) target voltages, (ii) measured voltages and (iii) measured voltages with a moving average filter to remove oscillatory components, for the capacitors 48 of the first limb portion 30 connected to Phase B. FIG. 15 shows (i) target voltages, (ii) measured voltages and (iii) measured voltages with a moving average filter to remove oscillatory components, for the capacitors 48 of the first limb portion 30 connected to Phase B.

Figure 16:
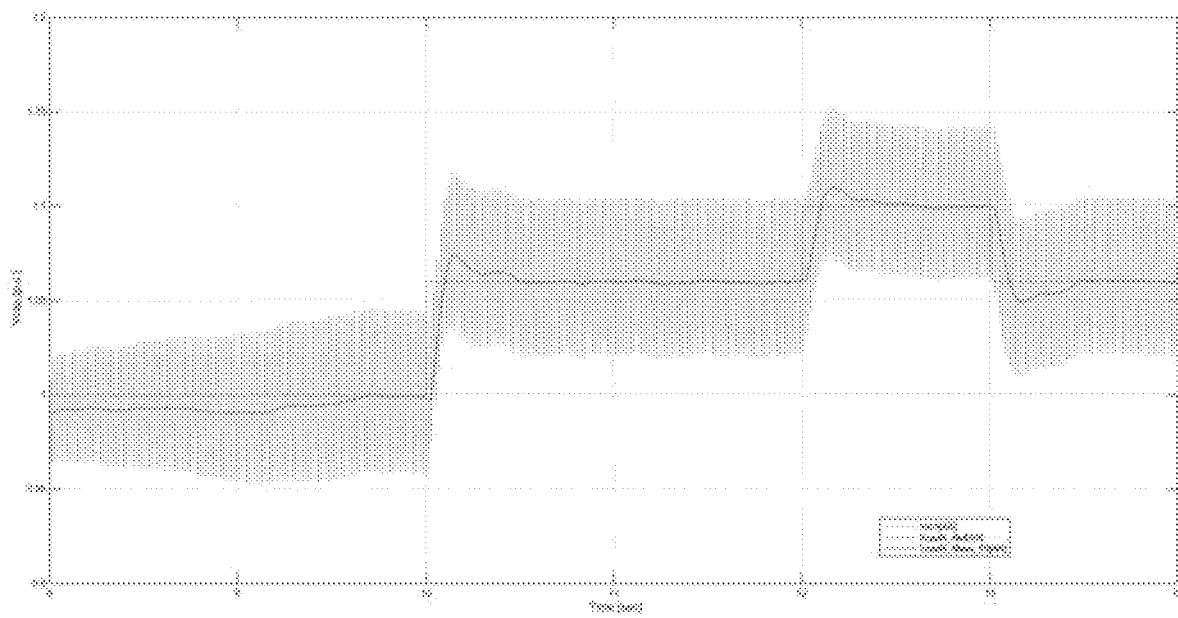
Figure 17:
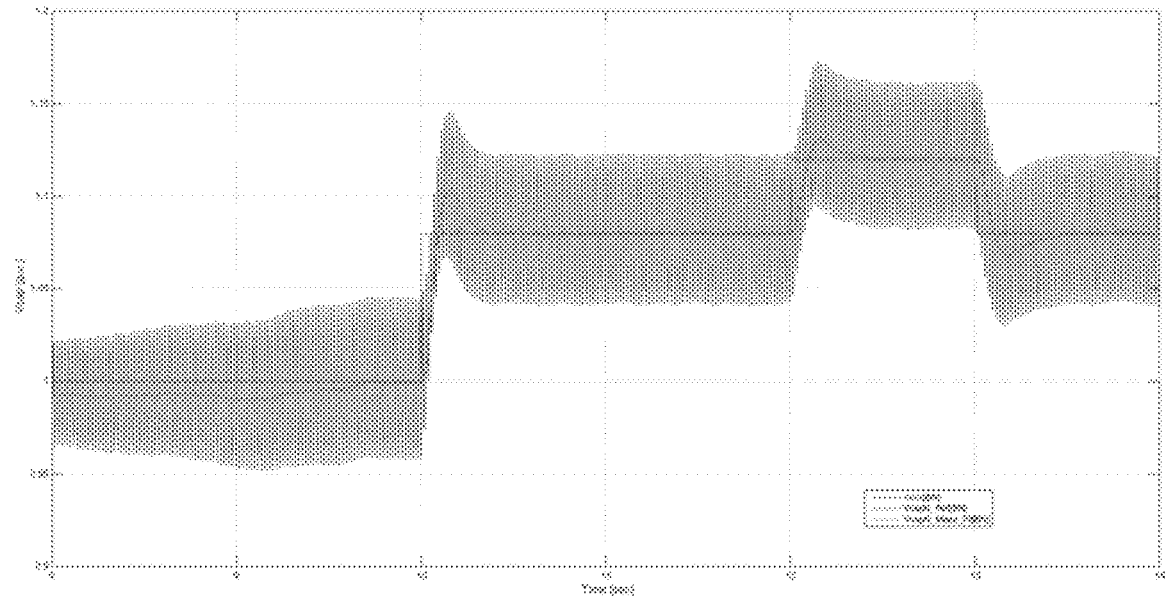
Figure 18:
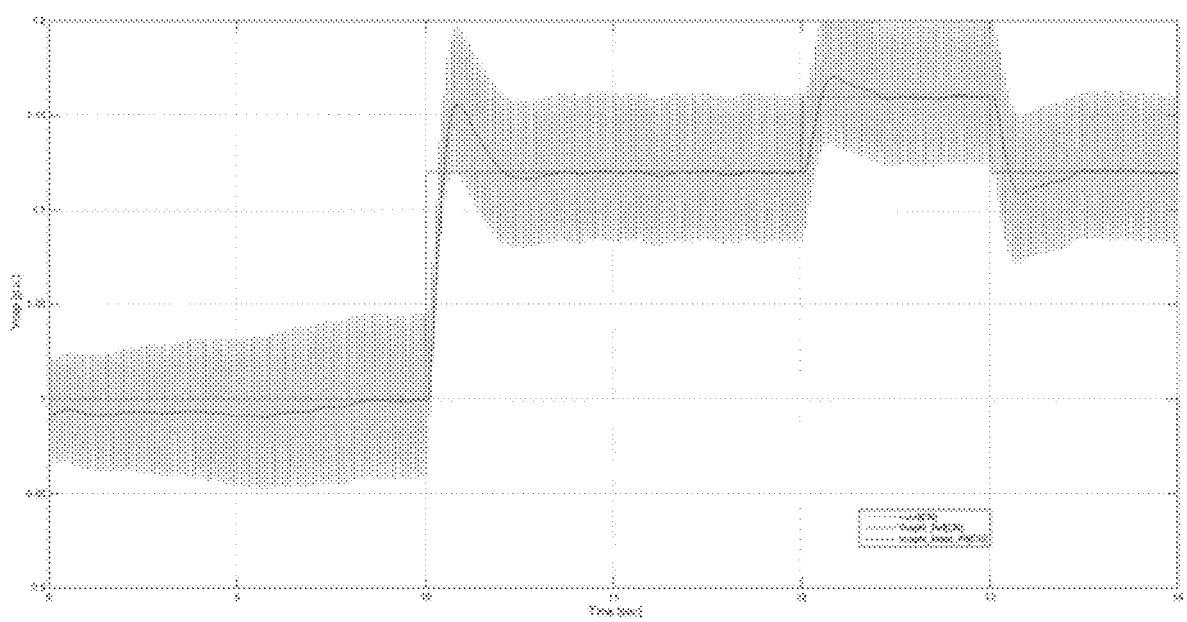

FIG. 16 shows (i) target voltages, (ii) measured voltages and (iii) measured voltages with a moving average filter to remove oscillatory components, for the capacitors 48 of the second limb portion 32 connected to Phase A. FIG. 17 shows (i) target voltages, (ii) measured voltages and (iii) measured voltages with a moving average filter to remove oscillatory components, for the capacitors 48 of the second limb portion 32 connected to Phase B. FIG. 18 shows (i) target voltages, (ii) measured voltages and (iii) measured voltages with a moving average filter to remove oscillatory components, for the capacitors 48 of the second limb portion 32 connected to Phase C.

We claim:

1. A switching valve for a voltage source converter, the switching valve comprising:
   a plurality of modules, each module including at least one switching element and at least one energy storage device,
   the or each switching element and the or each energy storage device in each module arranged to be combinable to selectively provide a voltage source,
   the switching valve including a regulator programmed to selectively control the switching of the switching elements to select one or more of the modules to contribute a respective voltage to a switching valve voltage, wherein the regulator is programmed to selectively regulate an energy stored in each energy storage device by controlling the switching of the switching elements to regulate a voltage of each energy storage device to or towards a target voltage, and the regulator is programmed to vary the target voltage of each energy storage device as a function of a number of healthy modules in the switching valve, wherein the regulator is programmed to determine the target voltage of each energy storage device as a function of a voltage factor of the voltage source converter when varying the target voltage of each energy storage device as a function of a number of healthy modules in the switching valve so that the energy stored in each energy storage device stays above a lower energy storage limit of that energy storage device, wherein the voltage factor is a function of a measured direct current (DC) voltage of the voltage source converter, and wherein the regulator is further programmed to:
compare the voltage factor to a voltage factor reference threshold; and
apply a voltage offset to the target voltage based on the comparison.

2. A switching valve according to claim 1, wherein the plurality of modules includes at least one redundant module.

3. A switching valve according to claim 1, wherein the regulator is programmed to selectively maintain a sum of the voltages of the modules when varying the target voltage of each energy storage device as a function of a number of healthy modules in the switching valve.

4. A switching valve according to claim 1, wherein the regulator is programmed to selectively maintain a total energy stored in the switching valve when varying the target voltage of each energy storage device as a function of a number of healthy modules in the switching valve.

5. A switching valve according to claim 1, wherein the regulator is programmed to determine the target voltage of each energy storage device as a function of an actual operating condition of the voltage source converter when varying the target voltage of each energy storage device as a function of a number of healthy modules in the switching valve so that the energy stored in each energy storage device stays within energy storage limits of that energy storage device.

6. A switching valve according to claim 1, wherein the regulator is programmed to determine the target voltage of each energy storage device as a function of a measured maximum voltage out of the voltages of the energy storage devices when varying the target voltage of each energy storage device as a function of a number of healthy modules in the switching valve so that the energy stored in each energy storage device stays below an upper energy storage limit of that energy storage device.

7. A voltage source converter comprising at least one switching valve according to claim 1.

8. A voltage source converter according to claim 7, including a plurality of switching valves, each switching valve according to claim 1, wherein the variation of the target voltage of each energy storage device as a function of a number of healthy modules in each switching valve is performed independently of the variation of the target voltage of each energy storage device as a function of a number of healthy modules in the or each other switching valve.

9. A voltage source converter according to claim 7, including a plurality of switching valves, wherein the regulator is programmed to determine the target voltage of each energy storage device as a function of a measured maximum voltage out of the voltages of the energy storage devices of the switching valves when varying the target voltage of each energy storage device as a function of a number of healthy modules in the switching valve so that the energy stored in each energy storage device stays below an upper energy storage limit of that energy storage device.

10. A method of operating a switching valve, wherein the switching valve is for a voltage source converter, the switching valve comprising a plurality of modules, each module including at least one switching element and at least one energy storage device, the or each switching element and the or each energy storage device in each module arranged to be combinable to selectively provide a voltage source, the method comprising the steps of:

controlling the switching of the switching elements to select one or more of the modules to contribute a respective voltage to a switching valve voltage;

regulating an energy stored in each energy storage device by controlling the switching of the switching elements to regulate a voltage of each energy storage device to or towards a target voltage;

varying the target voltage of each energy storage device as a function of a number of healthy modules in the switching valve;

determining the target voltage of each energy storage device as a function of a voltage factor of the voltage source converter when varying the target voltage of each energy storage device as a function of a number of healthy modules in the switching valve so that the energy stored in each energy storage device stays above a lower energy storage limit of that energy storage device, wherein the voltage factor is a function of a measured direct current (DC) voltage of the voltage source converter;

comparing the voltage factor to a voltage factor reference threshold; and applying a voltage offset to the target voltage based on the comparison.

11. A method according to claim 10, including the step of maintaining a sum of the voltages of the energy storage devices when varying the target voltage of each energy storage device as a function of a number of healthy modules in the switching valve.

12. A method according to claim 10, including the step of maintaining a total energy stored in the switching valve when varying the target voltage of each energy storage device as a function of a number of healthy modules in the switching valve.

13. A method of operating a voltage source converter, the voltage source converter comprising at least one switching valve, the or each switching valve comprising a plurality of modules, each module including at least one switching element and at least one energy storage device, the or each switching element and the or each energy storage device in each module arranged to be combinable to selectively provide a voltage source, the method comprising the method of claim 10.

* * * * *